(12) United States Patent
Gollackner et al.

(10) Patent No.: US 12,693,642 B2
(45) Date of Patent: Jul. 28, 2026

(54) BUILDING AUTOMATION NETWORK

(71) Applicant: Siemens Schweiz AG, Zürich (CH)

(72) Inventors: Thomas Gollackner, Oberägeri (CH); Michele Remonato, Zug (CH); Mohit Soral, Pune Maharashtra (IN)

(73) Assignee: SIEMENS SCHWEIZ AG, Zurich (CH)

( * ) Notice: Subject to any disclaimer, the term of this patent is extended or adjusted under 35 U.S.C. 154(b) by 614 days.

(21) Appl. No.: 18/251,794

(22) PCT Filed: Jan. 25, 2021

(86) PCT No.: PCT/EP2021/051584
§ 371 (c)(1),
(2) Date: May 4, 2023

(87) PCT Pub. No.: WO2022/100890
PCT Pub. Date: May 19, 2022

(65) Prior Publication Data
US 2024/0019824 A1      Jan. 18, 2024

(30) Foreign Application Priority Data
Nov. 13, 2020    (IN) .............................. 202031049715

(51) Int. Cl.
*H04L 12/28*          (2006.01)
*G05B 15/02*          (2006.01)
(Continued)

(52) U.S. Cl.
CPC .............. *G05B 15/02* (2013.01); *G06F 9/451* (2018.02); *H04L 67/10* (2013.01); *H04L 67/562* (2022.05);
(Continued)

(58) Field of Classification Search
CPC .......... G05B 15/02; G05B 2219/25011; G05B 2219/2642; G06F 9/451; G06F 8/61;
(Continued)

(56) References Cited

U.S. PATENT DOCUMENTS 6,192,282 B1 *    2/2001    Smith ..................... G05B 15/02
                                                            700/20
10,375,047 B2    8/2019    Leblond et al.
(Continued)

FOREIGN PATENT DOCUMENTS

CN          108353090 A      7/2018    ............. H04L 12/29
CN          111367187 A      7/2020    ............. G05B 15/02
(Continued)

OTHER PUBLICATIONS

Cuffaro et al., A Resource-based Rule Engine for energy savings recommendations in Educational Buildings, 6 pages. (Year: 2017).*
(Continued)

*Primary Examiner* — Thuy Dao
(74) *Attorney, Agent, or Firm* — Slayden Grubert Beard PLLC

(57)          ABSTRACT

Various embodiments of the teachings herein include a building automation network. The network may include an embedded edge device having a data interface and an edge digital service agent adapted to automatically fetch container images of configured containers via the data interface from a cloud-based container repository for deployment as a container application in a persistent memory and a container engine adapted to run the deployed container application for performing tasks in the building automation network.

14 Claims, 7 Drawing Sheets

(51) Int. Cl.

| | |
|---|---|
| *G05B 19/401* | (2006.01) |
| *G06F 8/74* | (2018.01) |
| *G06F 9/44* | (2018.01) |
| *G06F 9/451* | (2018.01) |
| *G06F 11/263* | (2006.01) |
| *G06F 16/90* | (2019.01) |
| *H04L 67/10* | (2022.01) |
| *H04L 67/562* | (2022.01) |

(52) U.S. Cl.
CPC .............. *G05B 2219/25011* (2013.01); *G05B 2219/2642* (2013.01)

(58) Field of Classification Search
CPC .... G06F 8/65; G06F 16/3334; G06F 16/3329; G06F 16/3344; H04L 67/562; H04L 67/10; H04L 67/34; H04L 12/2834; H04L 12/28; H04L 12/4625; H04L 41/085; H04L 12/2814; H04L 41/082; H04L 69/18; H04W 4/70
See application file for complete search history.

(56) References Cited

U.S. PATENT DOCUMENTS

| | | | |
|---|---|---|---|
| 10,379,842 B2 | 8/2019 | Malladi et al. | |
| 10,504,070 B2 * | 12/2019 | Jacobson | ............... G05B 15/02 |
| 2011/0191764 A1 * | 8/2011 | Piorecki | .................... G06F 8/65 |
| | | | 717/172 |

| | | | |
|---|---|---|---|
| 2015/0207758 A1 * | 7/2015 | Mordani | ................. H04L 47/78 |
| | | | 709/226 |
| 2015/0331395 A1 * | 11/2015 | Hepperla | .............. G05B 11/01 |
| | | | 700/9 |
| 2018/0331843 A1 * | 11/2018 | Bag | ..................... H04L 12/2814 |
| 2020/0012488 A1 * | 1/2020 | Koval | ....................... G06F 8/71 |
| 2020/0327371 A1 | 10/2020 | Sharma et al. | |
| 2020/0351271 A1 | 11/2020 | Murdoch et al. | |
| 2020/0356415 A1 | 11/2020 | Goli | |
| 2021/0167794 A1 * | 6/2021 | Richart | .................... H04Q 9/00 |

FOREIGN PATENT DOCUMENTS

| | | | |
|---|---|---|---|
| CN | 111667384 A | 9/2020 | ............. G05B 15/02 |
| CN | 111 880 430 | 11/2020 | ............. G05B 15/02 |
| WO | 2018 217483 | 11/2018 | ............. G05B 15/02 |

OTHER PUBLICATIONS

Search Report for International Application No. PCT/EP2021/051584, 15 pages, Jul. 19, 2021.

Yang, Yu-Sheng et al: "An Implementation of High Efficient Smart Street Light Management System for Smart City"; IEEE Access; IEEE; USA; vol. 8; pp. 38568-38585, Feb. 21, 2020.

Gupta, Nitu et al: "Containerized Architecture for Edge Computing in Smart Horne : A consistent architecture for model deployment"; 2020 International Conference on Computer Communication and Informatics (ICCCI); IEEE; Jan. 22, 2020; pp. 1-8.

* cited by examiner

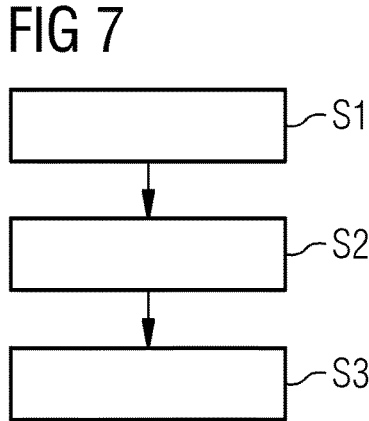

```
[{
    "orgId": "organizationId11- uuid",
    "appId": "applicationId11- uuid",
    "appVersionId": "applicationVersionId111- uuid",
    "installed": true,
    "updateAvailable": true,
},
{
    "orgId": "organizationId11- uuid",
    "appId": "applicationId22- uuid",
    "appVersionId": "applicationVersionId222- uuid",
    "installed": true,
    "updateAvailable": false,
},
{
    "orgId": "organizationId11- uuid",
    "appId": "applicationId33- uuid",
    "appVersionId": "applicationVersionId333- uuid",
    "installed": false,
    "updateAvailable": false,
},
]
```

BUILDING AUTOMATION NETWORK

CROSS-REFERENCE TO RELATED APPLICATIONS

This application is a U.S. National Stage Application of International Application No. PCT/EP2021/051584 filed Jan. 25, 2021, which designates the United States of America, and claims priority to IN Application No. 202031049715 filed Nov. 13, 2020, the contents of which are hereby incorporated by reference in their entirety.

TECHNICAL FIELD

The present disclosure relates to building automation networks. Various embodiments of the teachings herein include computer-implemented methods and/or systems for operating and managing the building automation network using container applications.

BACKGROUND

Container applications comprise applications which can be hosted in a container.

A building automation network can be used to perform tasks in a building such as controlling the building's heating, ventilation and/or air conditioning or lighting. A building automation network can connect different kinds of devices such as actuators, sensors or controllers provided in the building. A building automation system comprises a computer-based control system which can be installed in different kinds of buildings and which is adapted to control and/or to monitor a building's mechanical or electrical equipment, in particular a ventilation and lighting power system, a fire system and security systems provided in the building.

A building automation network can be provided to monitor and control a wide variety of different mechanical or electrical devices installed in a building including access control systems, fire alarm systems, elevator systems, communication systems, heating systems, ventilation systems and/or air conditioning systems. Sensors can be installed in different rooms of the system to provide raw sensor data processed to control actuators or to regulate a power supply. A typical goal of a building automation network within a building is to save energy consumed by actuators within the building. A building automation system can be quite complex because of the huge variety of different tasks to be performed by the different subsystems. In particular, the configuration and/or reconfiguration of hardware and/or software components within a building automation network is complex and in many cases error-prone. The configuration of a building automation network requires in many cases specific skills which are not easily available at the site of the building automation network.

SUMMARY

Accordingly, it is an object of the present invention to provide a building automation system which can be configured and updated in an easy and error-free manner. For example, some embodiments include a building automation network (1) comprising at least one embedded edge device (2) having an edge digital service agent (2A) adapted to fetch automatically container images of configured containers via a data interface (6) of said edge device (2) from a cloud-based container repository (5A) for deployment as a container application in a persistent memory (2C) of said edge device (2) and a container engine (2B) adapted to run the deployed container application for performing tasks in the building automation network (1).

In some embodiments, the deployed container application comprises a multi-container application composed of a group of multiple containers.

In some embodiments, the container engine (2B) of the embedded edge device (2) is adapted to run the container application deployed in the persistent memory (2C) of the embedded edge device (2) to perform tasks in the building automation network (1) in real time.

In some embodiments, the container application stored in the cloud-based repository (5A) is configured and updated by a centralized web user interface (5B) provided in the cloud (5).

In some embodiments, the data interface (6) of the embedded edge device (2) comprises a wired or wireless data interface connected to a message queuing telemetry transport (MQTT) client of said edge device (2) adapted to receive messages from a MQTT broker provided in the cloud (5).

In some embodiments, each container application comprises a unique container application identifier, an application version identifier, and one or more container application attributes.

In some embodiments, the container application attributes comprise a state and/or an update availability of the respective container application.

In some embodiments, the web user interface (5B) is connected to a cloud-based container engine (5C) comprising a rule engine module adapted to validate automatically a configuration of a container application configured or updated by means of the cloud user interface (5B).

In some embodiments, the configuration parameters of each container of the container application are configurable individually by means of the web user interface (5B) provided in the cloud (5).

In some embodiments, the configurable configuration parameters of a container comprise a container image URL, at least one image tag, a service identifiable name of the respective container, a network mode, resource consumption limits, volume mounting, firewall settings, port mappings, environmental variables and/or container communication parameters.

In some embodiments, an edge application manager (5D) is provided in the cloud (5) and adapted to manage the distribution of a plurality of container applications deployed in different edge devices (2) at multiple customer sites.

In some embodiments, the embedded edge device (2) of the building automation network (1) comprises a cloud gateway adapted to provide a cloud connectivity for building devices (4) including sensors, actuators, and/or controllers installed in a building and adapted to communicate with each other via the building automation network (1).

In some embodiments, access to the cloud-based web user interface (5B) provided to configure and/or to update a container application is only available to an authenticated user (U) authorized to perform configurations and/or reconfigurations of the respective container application.

In some embodiments, at least one container of the deployed container application is adapted to process data provided by building devices (4) of the building automation network (1) and to push messages and/or process data via the wired or wireless data interface (6) of the edge device (2) to the cloud (5).

As another example, some embodiments include a computer-implemented method for operating a building automation network (1) of a building connected to a cloud (5) via a data interface (6) of an embedded edge device (2), wherein the computer-implemented method comprises: performing (S1) a configuration of a container application by means of a central web user interface (5B) of the cloud (5); deploying (S2) the container application in a persistent memory (2C) of the edge device (2) of said building automation network (1) connected to the cloud (5), and running (S3) the deployed container application by a container engine (2B) of the edge device (2) of said building automation network (1).

As another example, some embodiments include a Building automation system comprising a plurality of building devices, wherein at least one of the building devices is connected to a building automation network as described herein, to operate the building automation system.

BRIEF DESCRIPTION OF THE DRAWINGS

In the following, possible embodiments of the teachings of the present disclosure are described in more detail with respect to the enclosed figures. In the drawings:

FIG. 3 shows a diagram for illustrating an example of a container application used by the building automation network incorporating teachings of the present disclosure;

FIG. 7 shows a flowchart for illustrating a possible exemplary embodiment of a computer-implemented method for operating a building automation network incorporating teachings of the present disclosure; and FIG. 8 shows exemplary declarations of container applications incorporating teachings of the present disclosure.

DETAILED DESCRIPTION

Figure 1:
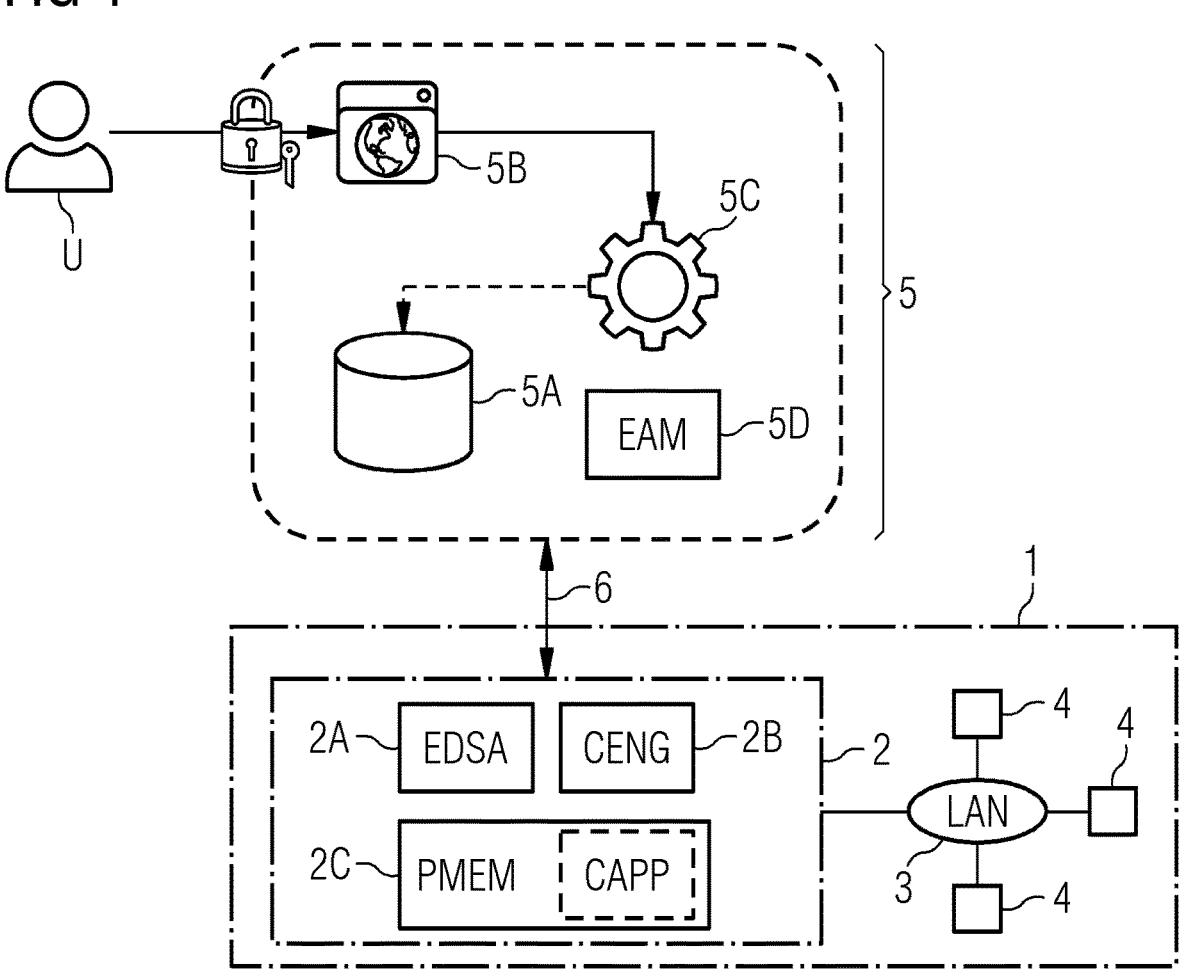
FIG. 1 is a diagram for illustrating the operation of a building automation network incorporating teachings of the present disclosure.

The teachings of the present disclosure include building automation networks. For example, some embodiments include at least one embedded edge device having an edge digital service agent adapted to fetch automatically container images of configured containers via a data interface of said edge device from a cloud-based container repository for deployment as a container application in a persistent memory of said edge device and a container engine adapted to run the deployed container application for performing tasks in the building automation network. It does not require any expert IT knowledge of an expert at the site of the customer or the building. The building can be any kind of building, in particular offices, schools, private homes or factories.

The building automation networks require only the provision of limited hardware resources as an embedded device at the on-premise site of the building or customer. The embedded edge device is easy to implement and requires only limited physical resources such as memory resources or computation resources at the site of the building automation network. In some embodiments, the embedded edge device can comprise a cloud gateway.

In some embodiments, the container application deployed in the persistent memory of the edge device comprises a multi-service application composed of a group of multiple containers.

In some embodiments, the container engine of the embedded edge device is adapted to run the container application deployed in the persistent memory of the embedded edge device to perform tasks in the building automation network in real time.

In some embodiments, the container application stored in the cloud-based repository of the cloud is configured and updated by a centralized web user interface provided in the cloud.

In some embodiments, the application image stored in the cloud-based repository is configured, managed and updated via a centralized web user interface provided in the cloud. This does allow a remote configuration, reconfiguration or update of any container application deployed at a customer site. Further, at the location of the centralized web user interface, all necessary resources as well as domain knowledge is available.

In some embodiments, the data interface of the embedded edge device of the building automation network comprises a wired or wireless data interface connected to a MQTT client of said edge device adapted to receive messages from a MQTT broker provided in the cloud. This supports communication where a network bandwidth is limited.

In some embodiments, the container application comprises a unique container application identifier, an application version identifier and one or more container application attributes. This facilitates the identification and individual update of different container applications deployed in the field.

In some embodiments, the container application attributes comprise a current state and/or an update availability of the respective container application and/or its containers.

In some embodiments, the centralized web user interface of the cloud is connected to a cloud-based container engine which comprises a rule engine module.

In some embodiments, the rule engine module of the cloud-based container engine is adapted to validate automatically a configuration of a container application configured or updated by means of the web user interface in the cloud. This increases the reliability of the building automation network configuration in this manner.

In some embodiments, configuration parameters of a container within a container application are configurable individually by means of the web user interface in the cloud.

In some embodiments, the configurable configuration parameters of a container comprise a container image URL, one or more image tags, a service identifiable name of the respective container, a network mode, resource consumption limits, volume mounting, firewall settings, port mappings, environmental variables and/or container communication parameters.

In some embodiments, an edge application manager is provided in the cloud and is adapted to manage the distribution of a plurality of container applications deployed in different edge devices at multiple customer sites.

In some embodiments, the embedded edge device comprises a cloud gateway adapted to provide a cloud connectivity for building devices installed in a building. These building devices comprise sensors, actuators, and/or controllers installed in the building and adapted to communicate with each other via the building automation network using a protocol.

In some embodiments, access to the cloud-based web user interface provided to configure and/or to update a container application is only available to an authenticated user authorized to perform configurations and/or reconfigurations of the respective container application. Every action performed by such an authorized user which may update or modify the configuration of one or multiple applications running on a single or multiple customer sites is audited. Details of all such actions performed are available at a centralized location to the platform administrators. In this way, the security of the operation of the building automation network is increased and no local installation on the embedded edge device is required.

In some embodiments, at least one container of the deployed container application is adapted to process data provided by devices of the building automation network and to push messages and/or the processed data via the wired or wireless data interface of the edge device to the cloud for further processing.

Some embodiments include a computer-implemented method for operating a building automation network of a building connected to a cloud via a data interface of an embedded edge device, wherein the computer-implemented method comprises: performing a configuration of a container application by means of a central web user interface of the cloud, deploying the container application in a persistent memory of the edge device of said building automation network connected to the cloud and running the deployed container application by a container engine of the edge device of said building automation network.

FIG. 1 shows a schematic configuration of a building automation network or building automation system 1 incorporating teachings of the present disclosure. As can be seen in FIG. 1, the building automation system 1 is formed by a building automation network which comprises at least one embedded edge device 2 connected via a local area network (LAN) 3 to a plurality of different building automation devices 4. The devices 4 can comprise sensor devices, actuators or controllers. The embedded edge device 2 can comprise a gateway providing cloud connectivity to a cloud 5 as illustrated in FIG. 1. The embedded edge device 2 comprises an edge digital service agent (EDSA) 2A and a container engine (CENG) 2B. The edge digital service agent 2A is adapted to fetch automatically container images and associated configurations of configured containers C via a data interface 6 of the edge device 2 from a cloud-based container repository 5A provided in the cloud 5.

The container images of the configured containers fetched via the data interface 6 are deployed as a container application CAPP in a persistent memory (PMEM) 2C of the embedded edge device 2. The container engine 2B of the edge device 2 is adapted to run the deployed container application for performing specific tasks in the respective building automation network 1. The deployed container application can comprise for instance a multi-container application CAPP composed of a group of multiple containers C. The container engine 2B of the embedded edge device 2 is adapted to run the container application deployed in the persistent memory 2C of the embedded edge device 2 to perform tasks in the building automation network 1 in real time. The container applications CAPPs stored in the cloud-based repository 5A can be configured or reconfigured and/or updated by a centralized cloud user interface 5B provided in the cloud 5. The cloud user interface 5B can be connected to a cloud-based container engine 5C as illustrated schematically in FIG. 1.

In some embodiments, the cloud-based container engine 5C can comprise a rule engine module. This rule engine module is adapted to validate automatically a configuration or reconfiguration of a container application CAPP configured or updated by means of the centralized cloud user interface 5B. In some embodiments, the cloud 5 comprises an edge application manager (EAM) 5D which can be used to manage the distribution of a plurality of container applications CAPPs deployed in different edge devices 2 at multiple customer sites or buildings. Dependent on the customer site needs a dedicated combination of container is installed at a specific customer site. The data interface 6 between the edge device 2 and the cloud 5 can comprise a wired data interface or a wireless data interface. In a possible embodiment, a MQTT client of the edge device 2 is connected to a MQTT broker provided in the cloud 5. The MQTT client of the edge device 2 is adapted to receive messages from the MQTT broker provided in the cloud 5.

In some embodiments, each container application CAPP configured in the cloud 5 and deployed in the building automation network 1 comprises a unique container application identifier CAPP-ID. Further, the container application CAPP can comprise an application version identifier as well as one or more container application attributes. These container application attributes can comprise a state and/or an update availability of the respective container application CAPP.

In some embodiments, configuration parameters of each container C within a container application CAPP are configurable individually by means of the cloud user interface 5B provided in the cloud 5. These configurable configuration parameters can comprise a variety of different relevant parameters including in particular a container image URL, at least one image tag or a service identifiable name of the respective container C. The configurable configuration parameters can further comprise a network mode, resource consumption limits, a volume mounting, firewall settings, port mappings or other container communication parameters. The configurable configuration parameters can also comprise environmental variables for defining data interfaces between container apps.

An access to the cloud-based user interface 5B of the cloud 5 used to configure and/or to update one or more containers C within a container application CAPP is in some embodiments only available to an authenticated user U who is also authorized to perform the required configurations and/or reconfigurations of containers C within the respective container application CAPP. In some embodiments, at least one container C of a container application CAPP deployed in the persistent memory 2C of the edge device 2 is adapted to process data provided by other devices 4 of the building automation network 1, in particular sensor devices. A container C can be adapted to push messages and/or the processed data via the wireless or wired data interface 6 of the edge device 2 to the cloud 5.

The operation of the building automation network 1 can be configured and/or reconfigured centrally based on container technology. At least one container application CAPP is deployed in a persistent memory 2C of the embedded edge device 2. In case that the data interface 6 between the cloud 5 and the edge device 2 is interrupted, safe and continuous operation of the building automation network 1 is guaranteed since the container application is deployed in the persistent memory 2C of the edge device 2. Also, a power interruption of the power supply of the edge device 2 does not affect the continuous operation of the building automation network 1 and with the container engine 2B it is ensured that the container resumes with the same state as before power failure.

Via the cloud user interface 5B, standard container configuration such as the image URL, tag, display name, network mode, port mapping, volume mounting, logs collection, key management, passed environmental variables can be managed. A complex configuration such as resource consumption limits, service restarts and health-check behavior can also be managed in the background using the edge application manager (EAM) 5D. Internal checks can be based on tools applied by internal rule engine modules to ensure that only validated configurations are applied to the containers of the container applications. A user U such as a developer can add specific configuration properties which may be required for a local installation on the respective building automation network 1. The configuration validations ensure that only valid configurations are applied to the building automation network 1. Further the configuration validation abstracts the complexity of the container engine 2B to the developer so that the user can focus on domain specific tasks for his application in the container.

Container configurations done via the cloud user interface 5B can be securely stored in the cloud 5. This is only provided for authenticated users U having the corresponding right access permissions. A second level security can ensure that configurations done for containers C owned by a specific team of users is accessible only for authorized users U of the same team and to no one else. A user U may not be allowed to add any arbitrary configurations that are not allowed by the cloud user interface 5B due to security reasons.

The single platform illustrated in FIG. 1 does support to manage configurations of containers C which can be written in different programming languages such as Go, Java, .NET, C++, Erlang. The centralized management configuration allows for operation of a large fleet of connected embedded edge devices 2 at different customer sites.

In some embodiments, the validation of configurations can be performed in a fully automated process, in particular using predefined tools applied by internal rule engines. In a possible implementation, results of configuration changes can also be fed back to the user U and do not require any activity from the user U to obtain detailed feedback. In case of an occurred error, a workflow can be automated on the user interface 5B.

Figure 2:
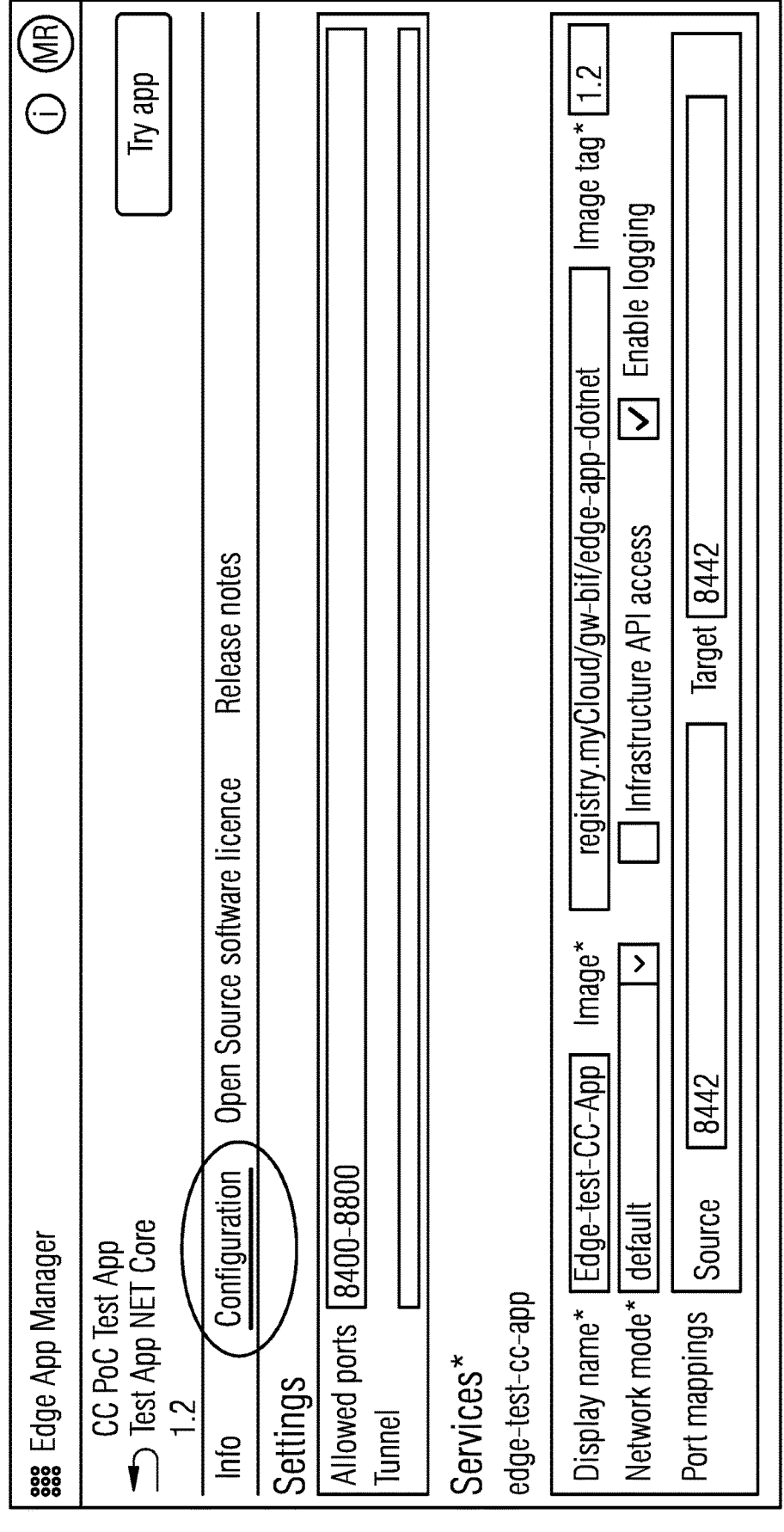
FIG. 2 shows an exemplary cloud user interface used for performing the configuration of container applications incorporating teachings of the present disclosure.

FIG. 2 shows an example of a cloud-based user interface 5B which can be used to perform configurations of container applications CAPPs. In the illustrated example, the container application CAPP with the application name "edge test CC-AP" comprises a container image "registry.mycloud/gw-bif/edge-app-dotnet" with an image tag as suggested with "MyCloud", e.g. 1.2. Further, the configuration comprises port mappings indicating port numbers of ports used for communication between different containers C of the same container application CAPP. With the settings, a range of allowed ports can be specified, e.g. 8,400 to 8,800 as illustrated in FIG. 2. The all-in-one cloud-based web user interface 5B has the advantage that it provides for a user-centered all-in-one user interface to perform also complex container configurations. The container configuration is agnostic of the used container environment technology such as Docker, Kubernetes, Linux, OCI, etc.

The cloud-based user interface 5B provides a single window which supports different kinds of containers C used in the different container technologies. The layout of the cloud-based user interface 5B shown in FIG. 2 is intuitive and allows a user U to follow a top-down approach to easily configure the respective container C of the container application CAPP. The user interface 5B abstracts the technical aspects allowing the user U to only focus on relevant configurations. The cloud-based container engine 5C behind the cloud-based user interface 5B can adapt standard adapter patterns. This can translate the user U to provide configurations into one-time engine specific instructions depending on the edge device 2 where the containers C are deployed and configured. When the user U applies the container configuration, the edge device 2 receives multiple instructions for fetching the container image, running the container, creating and/or loading the configuration and mounting them onto the container. In a possible embodiment, the user U can manage the container configurations through different states using for instance a in-built standard lifecycle management. This does allow to manage the configuration through development, testing, releasing and discontinuation.

Figure 3:
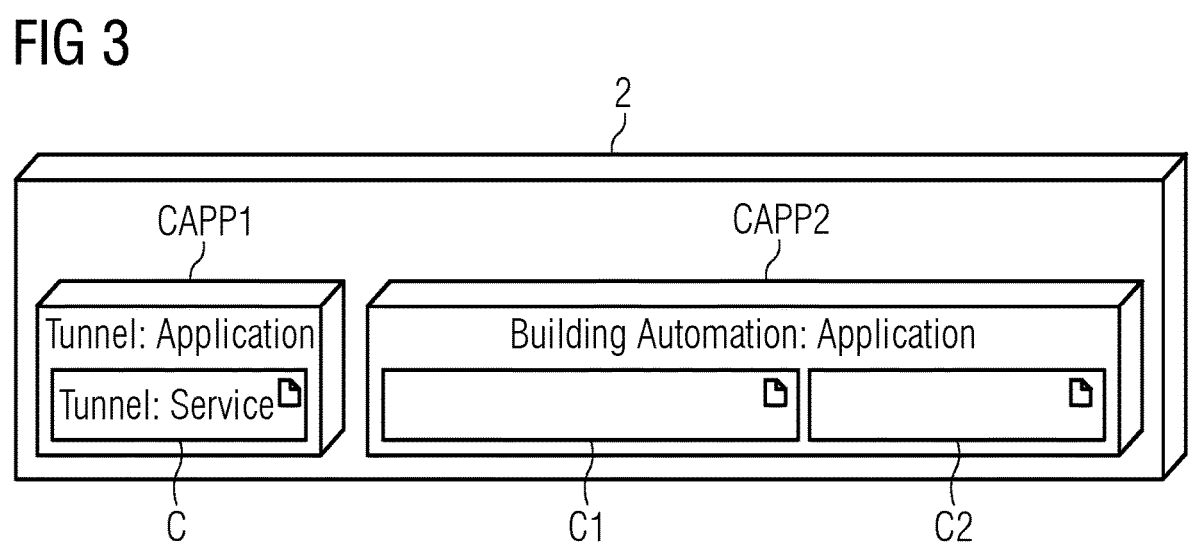

FIG. 3 illustrates a simple example of an edge device 2 having a memory 2C to store container applications CAPPs. In the illustrated example, the persistent memory 2C of the edge device 2 comprises two deployed container applications CAPP1, CAPP2 "building automation application". A first container application CAPP1 "tunnel" comprises a single container C whereas the other container application CAPP2 comprises two containers C1, C2. The container application can be adapted to perform a use case task on-premise at the site of the building or customer. The hardware or infrastructure of the edge device 2 does offer to the container applications CAPPs cloud connectivity logging and matrix. In some embodiments, the container application can comprise a list of predefined edge services wherein each edge service is realized with containers.

A platform as a service (PaaS) can deliver software in packages called containers C. These containers C are isolated from one another and do bundle their own software, libraries and configuration files. The containers C can communicate with each other through predefined channels. The containers C can run by a single operating system kernel and therefore require fewer resources than conventional virtual machines. A container C can be seen as a runtime instantiation of a container image. A container C generally can comprise two states, i.e. a resting or idle state and a running state. When at rest, a container C comprises a file or a set of files that can be stored in a memory or repository. This is also referred to as a container image which can be stored in a container repository of a cloud 5. It is possible to start a container C by a command. A container engine CENG unpacks the required files and metadata and then does hand them off to the operating system kernel.

Accordingly, the application of a container engine is adapted to run container images whereas a container repository can be used to transfer container images. The use of containers C allow applications to be deployed reliably and migrated quickly between various computing environments by a packaging code, configuration settings and dependencies into a single data object. The use of containers C provide high portability. Applications requiring immediate response times for carrying mission-critical weight have to be fast and shall not experience high latency or avoidable outages. The container applications CAPPs can be deployed to various geographically diverse points of presence at different building sites. They provide high levels of availability and reliability. In general, container applications CAPPs can be composed of a group of multiple containers C which may be defined in a compose file.

Using containers C allows the users U or developers to streamline the process of building, testing and deploying applications in a variety of different environments. The benefits of using containers C for operation of a building automation network 1 are inter alia of an increased consistency, efficiency, portability and security.

Container applications CAPPs do run regardless of the deployment environment. This eliminates the requirement for debugging across different technical environments. Further, containers C require fewer resources than standard virtual machines. This increases the efficiency. Further, once an application has been built-in and containerized, deployment can take place in any environment of any operating system.

Containers C do not interact even when they fit on the same operating system. When an attack is launched against an application, its effects are isolated and restricted to single containers. This does increase the operation security of the building automation network 1.

In some embodiments, the embedded edge device 2 of the building automation network 1 can comprise one or more container engines 2B. A container engine CENG forms a piece of software that does accept user requests, including command-line options and pull images and from the end user's perspective is adapted to run the containers C of the container application CAPP. The embedded edge device 2 may comprise container engines including Docker, rkt, cRIO or LXD. Access to the different applications can be granted by subscriptions.

Figure 4:
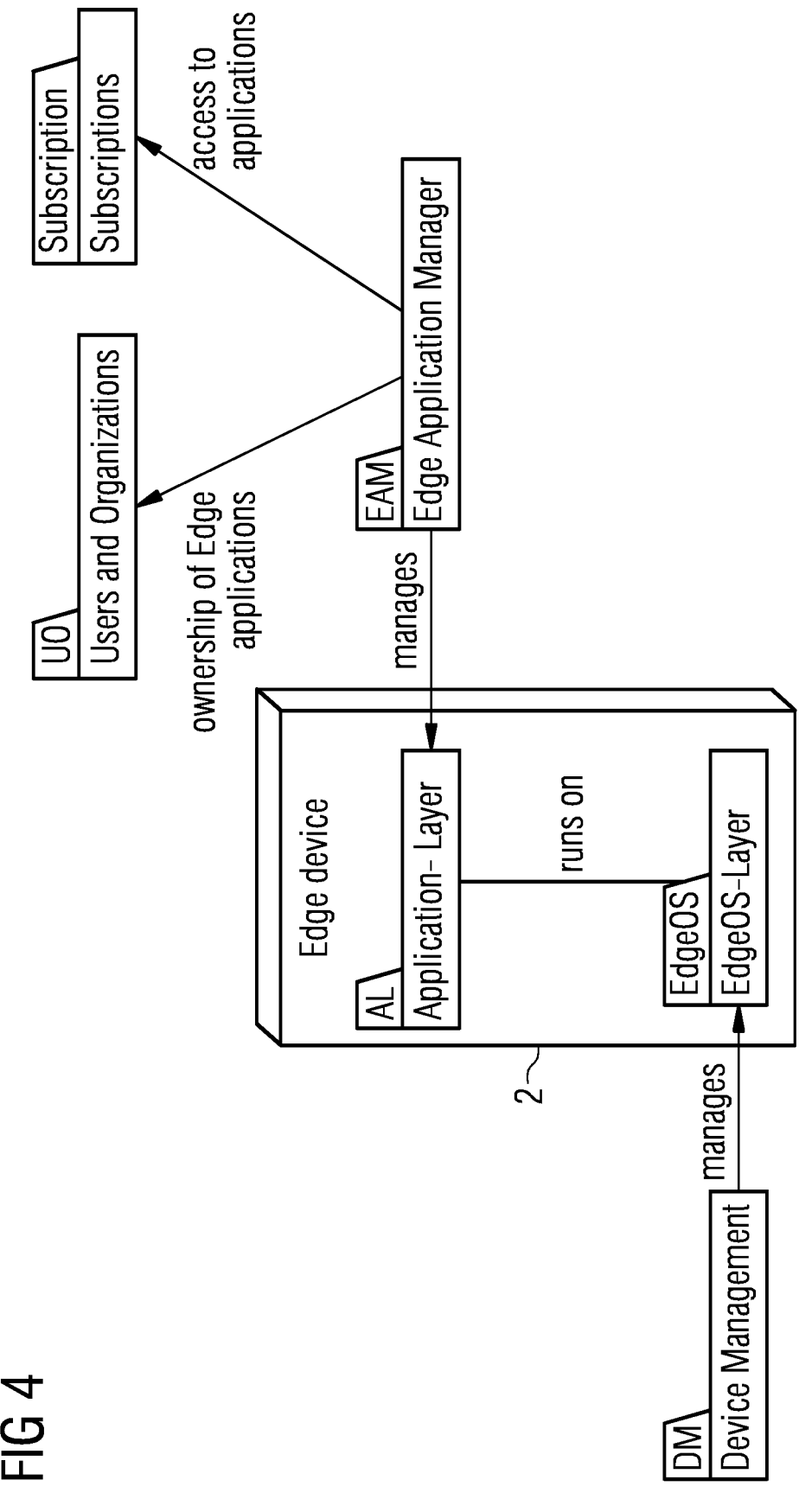
FIG. 4 shows a further diagram for illustrating the interplay of an edge device within a building automation network incorporating teachings of the present disclosure with other entities.

FIG. 4 illustrates the interplay of an embedded edge device 2 incorporating teachings of the present disclosure with an edge application manager EAM and a device management DM. The application runs on an edge operating system. In some embodiments, this is managed by a device management unit of the edge device 2. The edge application manager (EAM) 5D of the cloud 5 is adapted to manage the application layer AL. Users and organization UO are provided for access and control of the edge application manager EAM.

Figure 5:
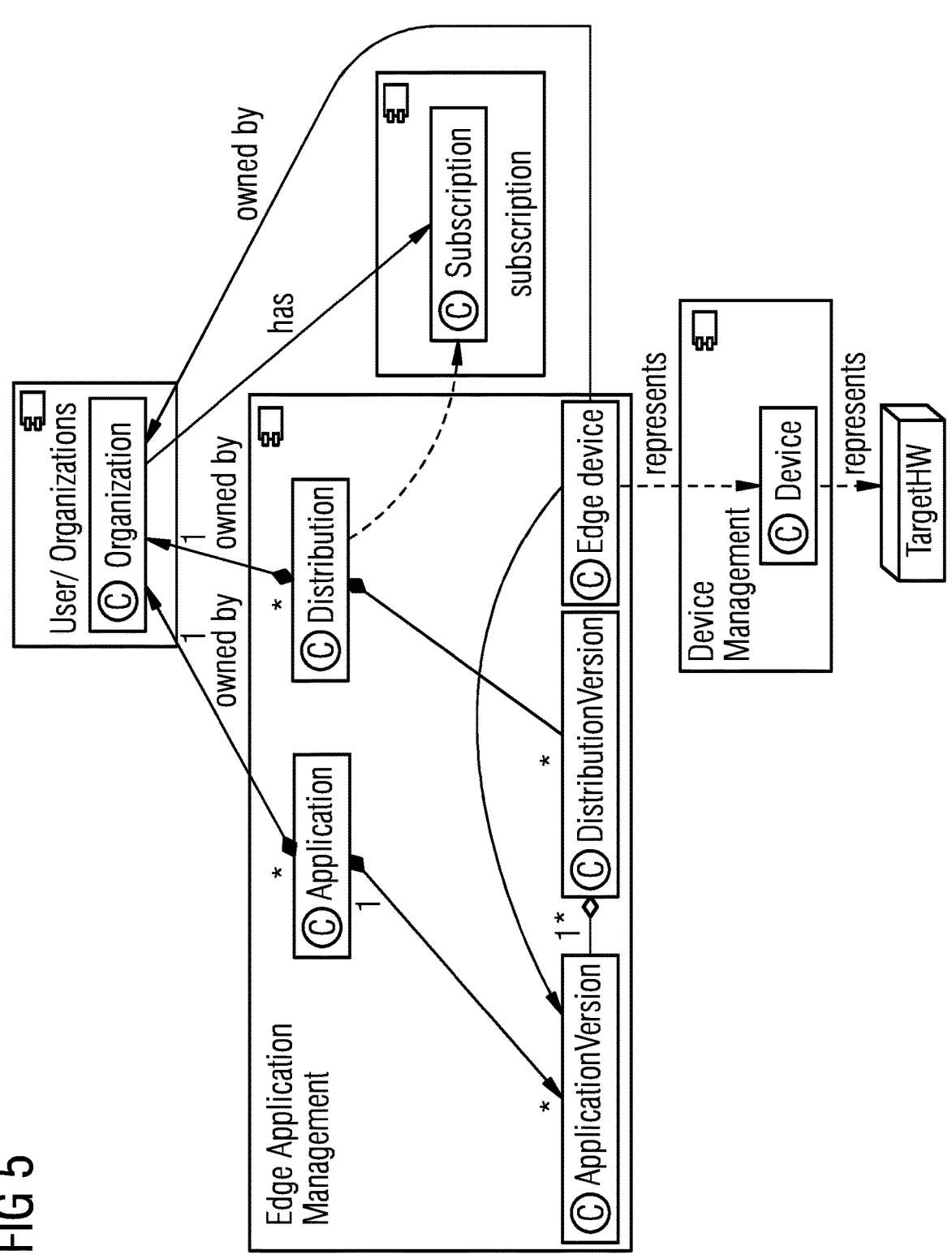
FIG. 5 illustrates a class model of different entities used in the system incorporating teachings of the present disclosure.

FIG. 5 illustrates an UML diagram showing a class model for the different entities in the system. The edge application manager (EAM) 5D is implemented in the cloud 5. The edge application management (EAM) 5D allows for remote management of the application layer of the edge devices 2. It allows to store and manage a container application CAPP centrally. Further, it is adapted to manage access to container applications CAPPs. It is possible to view and manage a container application CAPP on any edge device 2 on runtime. The edge application management (EAM) 5D can also provide tools and a development environment to develop different kinds of container applications CAPPs to be deployed in edge devices 2 of building automation networks 1 as target hardware.

The core class as illustrated in FIG. 5 comprise distribution, distribution version, distribution state, application, application version, edge. The distribution defines a product domain and the required subscription to access it.

A distribution version can comprise a selection of compatible application versions for this version of a distribution. Only one version per application may be included at a time. The distribution manager DM of the owning organization can be responsible for managing the application versions in the distribution version. When including application versions in a Distribution, the Distribution Manager can choose to configure a version to be automatically installed by default; or require a manual selection & installation by an authorized remote site engineer.

The distribution state represents a lifecycle of a distribution version. Based on the distribution state, a distribution version can be filtered for presentation. For example, customers may see only a distribution version in the state released and tester does see container with state "testing" only.

An application fulfills a dedicated use case such as a task within a building automation network 1. An application can contain metadata shared over application versions.

An application version can contain the release metadata including compatibility with the edge operating system and hardware. The application version allows for filtering for hardware architecture and operating system compatibility. The application version can contain the application definition. This specifies required services and declares their resource usages.

The edge is the representation of a physical edge device 2 managed by the device manager. It may be populated by events from the device manager. The edge can comprise a list of application versions to be installed on the physical edge device 2 of the building automation network 1.

Figure 6:
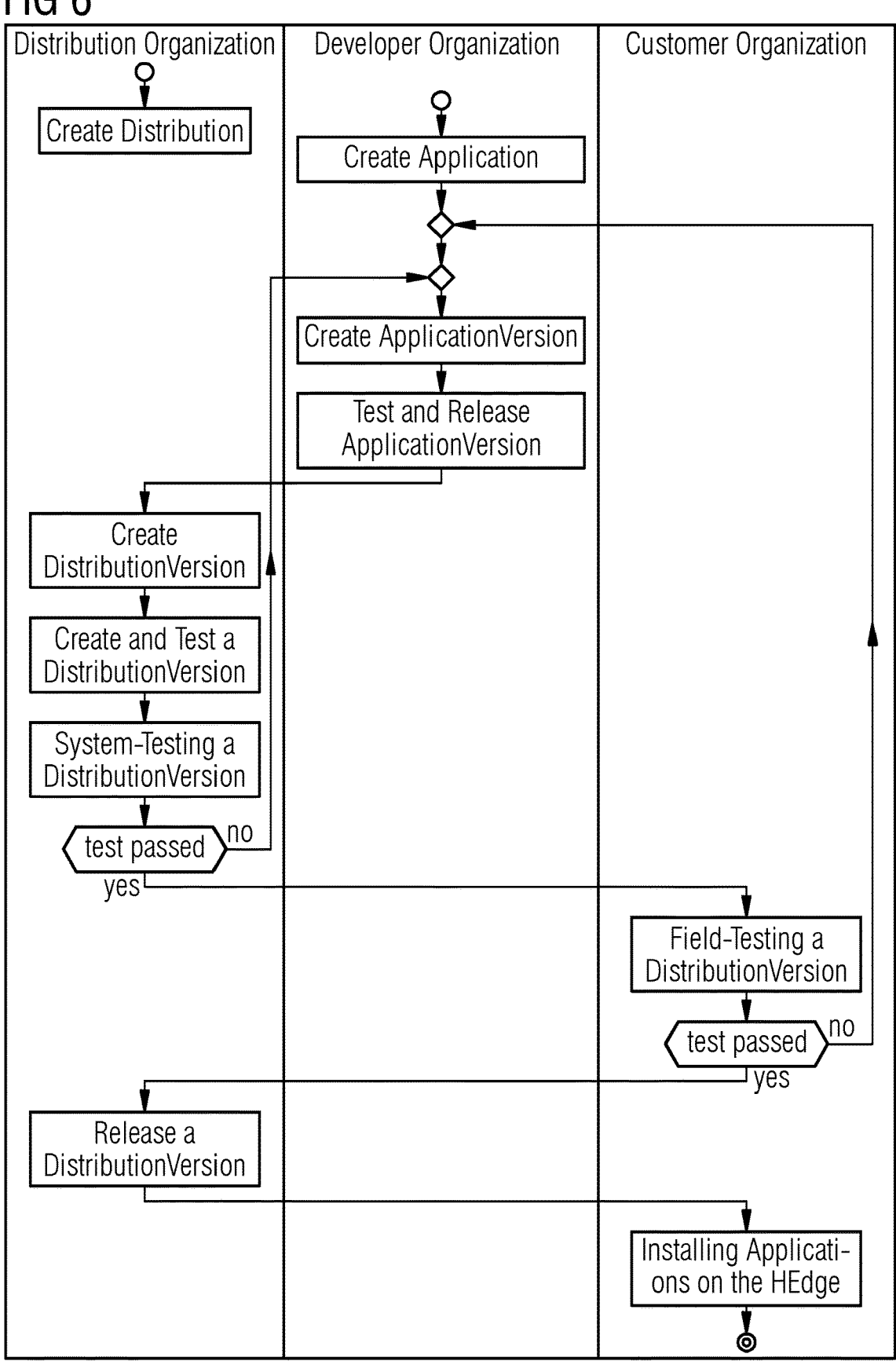
FIG. 6 shows a further diagram for illustrating the deployment of a customer application to the persistent storage of an embedded edge device of a building automation network incorporating teachings of the present disclosure.

FIG. 6 illustrates schematically the creation and deployment of container applications CAPPs. A container application CAPP can be created using the centralized cloud-based user interface 5B.

After test and release of the application version, a test can be performed by the distribution organization. After a successful test, field testing at the site of the customer organization can be performed. Finally, a distribution version is released and can be installed on the edge device 2 of the building automation network 1 as shown in FIG. 6.

FIG. 8 shows an example of the declaration of three different container applications CAPPs with different application IDs (ID11, ID22, ID33) for a customer organization with a specific organization ID. Further, the declaration comprises for each container application CAPP an application version ID as well as the container application attributes "installed" and "update available".

FIG. 7 illustrates a flowchart of an example method for operating a building automation network 1 of a building incorporating teachings of the present disclosure. In the illustrated embodiment, the computer-implemented method comprises three main steps.

In a first step S1, a configuration of a container application CAPP is performed by a central user interface 5B of the cloud 5. In some embodiments, the configured container application CAPP can be stored in a container repository 5A of the cloud 5.

In a further step S2, the at least one container application CAPP is deployed in a persistent memory 2C of the embedded edge device 2 of the building automation network 1 connected to the cloud 5 via a data interface 6.

In a further step S3, the deployed container application CAPP stored in the persistent memory 2C of the edge device 2 is run automatically by a container engine 2B implemented in the edge device 2 of the building automation network 1. Further also the reverse operation: UNinstalling an app is supported.

In this way, a user U who develops and maintains container configurations can perform their activities via the cloud 5 remotely through the user interface 5B. The configuration can be also performed by teams interactively. As soon as an edge device 2 has been installed at the building automation network 1, an automatic deployment process can be initiated where the configured container application CAPP is deployed in a memory of the edge device 2. After the container application CAPP has been deployed, in later stages, it is possible to perform individual updates of containers C within the container application CAPP to increase efficiency and functionality of the respective container application CAPP. A container application CAPP can be used for a wide variety of different technical tasks within a building such as analytical tasks or safety-related tasks. A container application CAPP can also be used e.g. to save power consumed by devices within a building.

In some embodiments, the embedded edge device 2 is a physical device forming a connecting point between the cloud 5 and devices 4 of the building automation network 1 such as controllers, sensors and actuators installed in the building. The edge device 2 may integrate BACnet/IP or Modbus/TCP devices in systems as well as different protocols such as a fire system protocol. The edge device 2 can transmit data to the cloud 5 in a possible embodiment over cable networks. In an alternative embodiment, the edge device 2 can be connected over mobile devices such as USB dongles.

In some embodiments, the edge device 2 comprises a 2 GB RAM and an 8 GB eMMC as a persistent memory 2C. The edge device 2 may support different kinds of internal protocols. The edge device 2 may comprise a local power supply for instance with an operating voltage of 24 VDC or 24 VAC which reduces installation costs. The edge device 2 comprises in a possible implementation a WAN internet access.

In some embodiments, the edge device 2 can comprise a dual-core processor used by the container engine 2B to execute or run the deployed container applications CAPPs. The edge device 2 can comprise a plastic housing with holes used for mounting the edge device 2 to a wall of the building. The edge device 2 may comprise different kinds of interfaces, in particular at least one-port Ethernet for WAN providing cloud connectivity. It may also provide several Ethernet interfaces for one or more local area networks LANs, i.e. for one or more local building automation networks 1. In some embodiments, the device 2 can also comprise an USB interface for 4G/5G dongles. The edge device 2 can support various protocols such as BACnet or a Modbus and different media such as Ethernet or a serial EIA-485 bus. It can support Ethernet or 4G/5G on cloud level via the MQTT protocol.

The edge device 2 using a deployed container application CAPP configured by a central user interface 5B does reduce development costs and time to market. Further, the configuration becomes more efficient and less time-consuming thanks to fully cloud-based operations. The system provides a central configuration interface 5B for multiple container applications CAPPs deployed at different customer sites. Further, cybersecurity is increased. High-standard configurations are ensured by reducing human-error misconfigurations. A misconfiguration by a malicious user can thereby be prevented. Further, the configuration process can be performed to a wide extent automatically without manual intervention of a user, in particular it does not require the manual intervention of a user at the site of the building automation network 1. Further, the configuration can be performed remotely without requiring the presence of an operator or technician at the site of the building automation network 1. Since the container configuration is performed within the cloud 5, the testing and debugging of containers C is simplified. This in turn simplifies any lifecycle management of the container applications CAPPs deployed in the field.

LIST OF REFERENCE SIGNS

1 building automation network
2 embedded edge device
2A edge digital service agent
2B container engine
2C persistent memory
3 LAN
4 network device
5 cloud
5A repository
5B cloud user interface
5C cloud container engine
5D edge application manager (EAM)
6 data interface

What is claimed is:

1. A building automation network comprising:
an embedded edge device having a data interface and an edge digital service agent adapted to automatically fetch container images of configured containers via the data interface from a cloud-based container repository for deployment as a container application in a persistent memory; and
a container engine adapted to run the deployed container application for performing tasks in the building automation network;
wherein the deployed container application stored in the persistent memory is configured and updated by a centralized web user interface provided in the cloud; and
the centralized web user interface is connected to a cloud-based container engine comprising a rule engine module adapted to validate automatically a configuration of the deployed container application configured or updated by means of the centralized web user interface.

2. The building automation network according to claim 1, wherein the deployed container application comprises a multi-container application composed of a group of multiple containers.

3. The building automation network according to claim 1, wherein the container engine of the embedded edge device is adapted to run the container application deployed in the persistent memory to perform tasks in the building automation network in real time.

4. The building automation network according to claim 1, wherein the data interface of the embedded edge device comprises a wired or wireless data interface connected to a message queuing telemetry transport (MQTT) client of the embedded edge device adapted to receive messages from a MQTT broker provided in the cloud.

5. The building automation network according to claim 1, wherein each deployed container application comprises:
a unique container application identifier;
an application version identifier; and
one or more container application attributes.

6. The building automation network according to claim 5, wherein each deployed container application attributes comprise a state and/or an update availability of the respective deployed container application.

7. The building automation network according to claim 1, wherein configuration parameters of each container of the deployed container application are configurable individually using the centralized web user interface provided in the cloud.

8. The building automation network according to claim 7, wherein the configurable configuration parameters of a container comprise:

a container image URL, at least one image tag, a service identifiable name of the respective container, a network mode, resource consumption limits, volume mounting, firewall settings, port mappings, environmental variables, and/or container communication parameters.

9. The building automation network according to claim 1, further comprising an edge application manager deployed in the cloud to manage distribution of a plurality of container applications deployed in different edge devices at multiple customer sites.

10. The building automation network according to claim 1, wherein the embedded edge device comprises a cloud gateway adapted to provide a cloud connectivity for building devices including sensors, actuators, and/or controllers installed in a building and adapted to communicate with each other via the building automation network.

11. The building automation network according to claim 1, wherein access to the centralized web user interface provided to configure and/or to update a deployed container application is only available to an authenticated user authorized to perform configurations and/or reconfigurations of the respective container application.

12. The building automation network according to claim 1, wherein at least one container of the deployed container application is adapted to process data provided by building devices of the building automation network and to push messages and/or process data via the data interface of the embedded edge device to the cloud.

13. A computer-implemented method for operating a building automation network of a building connected to a cloud via a data interface of an embedded edge device, the method comprising:

configuring a container application using a central web user interface of the cloud;

deploying the container application in a persistent memory of the embedded edge device; and running the deployed container application using a container engine of the embedded edge device;

wherein the deployed container application stored in the persistent memory is configured and updated by a centralized web user interface provided in the cloud; and the centralized web user interface is connected to a cloud-based container engine comprising a rule engine module adapted to validate automatically a configuration of the deployed container application configured or updated by means of the centralized web user interface.

14. A building automation system comprising:

a plurality of building devices;

wherein at least one of the building devices includes an embedded edge device having a data interface and an edge digital service agent adapted to automatically fetch container images of configured containers via the data interface from a cloud-based container repository for deployment as a container application in a persistent memory; and a container engine adapted to run the deployed container application for performing tasks in the building automation system;

wherein the deployed container application stored in the persistent memory is configured and updated by a centralized web user interface provided in the cloud; and the centralized web user interface is connected to a cloud-based container engine comprising a rule engine module adapted to validate automatically a configuration of the deployed container application configured or updated by means of the centralized web user interface.

* * * * *